G. W. COLLIN.
AUTOMATIC STEAM CUT-OFF VALVE.
APPLICATION FILED JAN. 15, 1909.

972,338.

Patented Oct. 11, 1910.
2 SHEETS—SHEET 2.

WITNESSES
Ernst P. Wold
Ruth Raymond.

INVENTOR
George W. Collin
BY
Chamberlain & Newman
ATTORNEYS

UNITED STATES PATENT OFFICE.

GEORGE W. COLLIN, OF BRIDGEPORT, CONNECTICUT.

AUTOMATIC STEAM-CUT-OFF VALVE.

972,338. Specification of Letters Patent. Patented Oct. 11, 1910.

Application filed January 15, 1909. Serial No. 472,447.

*To all whom it may concern:*

Be it known that I, GEORGE W. COLLIN, a citizen of the United States, and resident of Bridgeport, in the county of Fairfield and State of Connecticut, have invented certain new and useful Improvements in Automatic Steam-Cut-Off Valves, of which the following is a specification.

My present invention relates to a duplex steam boiler cut off valve, adapted for use in a main steam pipe line where an automatic closing of the valve is desired as for instance when a break occurs in the line.

The valve is designed for use in various forms of steam connections, as for instance in a main line from a boiler to an engine, for automatically cutting off the steam supply should the piping or other connections beyond the valve break, or again in the steam connection from a boiler to a header that is connected to one or more other boilers in battery, and whereby the steam is not only cut off when a break occurs in or beyond the header but likewise to insure the closing of the valve should the particular boiler to which it is connected become ruptured or for other reason its pressure fall below that in the header. The valve is therefore adapted to automatically close and cut off the passage of steam therethrough in either direction should an accident occur on either side of the valve.

It is therefore the purpose of my invention to produce a simple and practical form of duplex cut off valve which will fully meet the conditions and requirements for boiler connections of the above kind and which can be inexpensively manufactured and readily sold.

Figure 1:
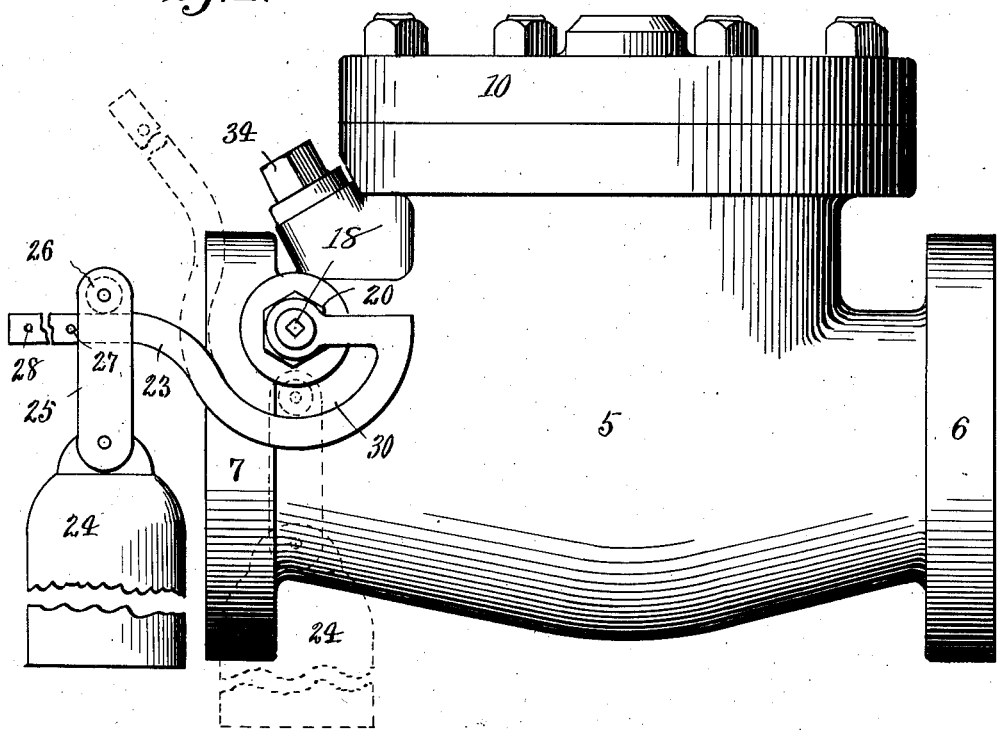
Figure 2:
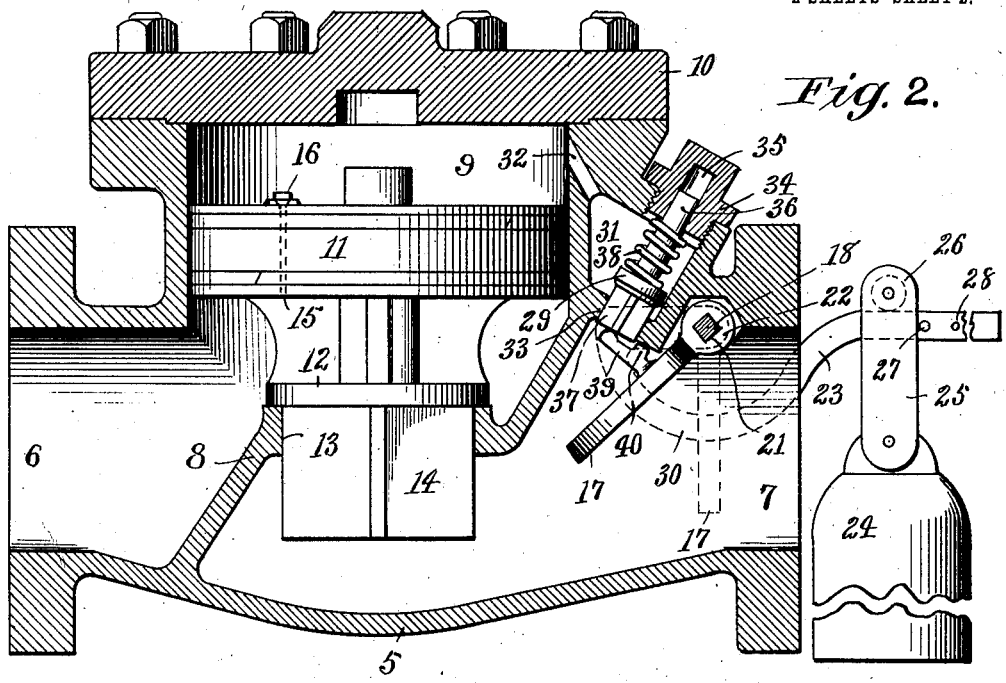
Figure 3:
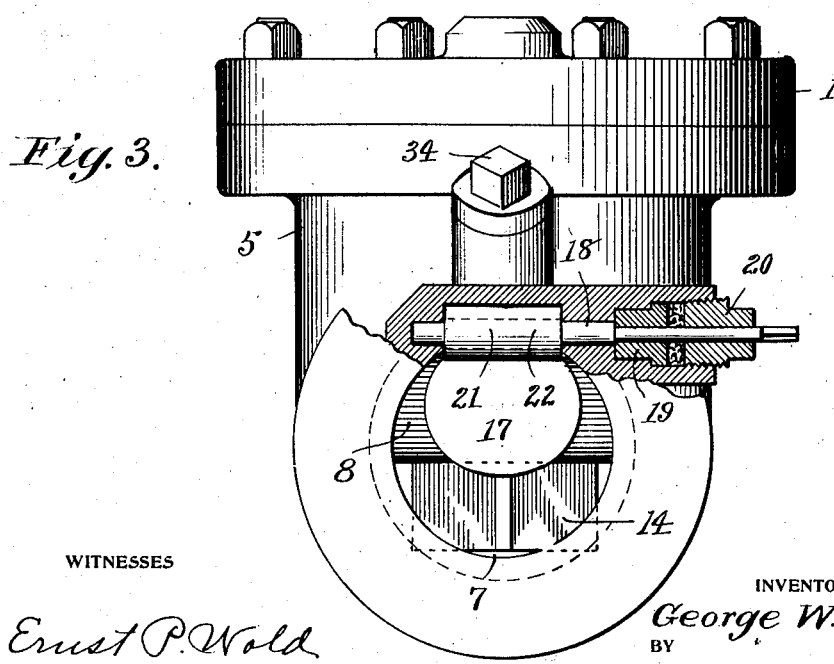

With the above and other minor objects in view my invention resides and consists in the novel construction and combination of parts shown upon the accompanying two sheets of drawings forming a part of this specification, upon which similar characters of reference denote like or corresponding parts throughout the several figures, and of which, Figure 1, shows a side elevation of my improved form of duplex steam boiler cut off valve, set for operation. Fig. 2, is a central vertical longitudinal sectional view of the valve as seen in Fig. 1, and Fig. 3, is an end elevation partially broken away as seen from the right of Fig. 2.

Referring in detail to the characters of reference marked upon the drawings 5 indicates the valve body having an inlet 6 and an outlet 7, with a division wall 8 therebetween. The upper cylindrical chamber 9 communicates with the said inlet and is inclosed by a cover 10. A piston 11 is operatively mounted within the said chambers 9 and has connected therewith a flat seating type of valve 12 which closes a port 13 in the before mentioned division wall 8 and through which guide wings 14 of the valve reciprocate to insure the proper registering of the valve with the seat and the free operation of the piston. The piston 11 is provided with a port 15 extending therethrough and having a seat to accommodate a pin valve 16 whereby the live steam is permitted to pass into the upper chamber above the piston but is prevented from returning.

A swinging disk 17 is suspended in the outlet portion 7 of the valve and is mounted upon a transverse rocker shaft 18 journaled in the upper portion of the body and projects outside through a stuffing gland 19 and a plug 20. The inner portion 21 of this shaft is squared to engage a correspondingly shaped hole in the hub 22 of the disk to form a secure engagement and insure the turning of one with the other. The outer end of the shaft is also squared to form a shoulder to which a special shaped lever 23 is secured and from which is suspended a weight 24. The weight is suspended from the lever by a small wheel 26 pivoted between the hangers 25 to which the weight is attached and is designed to ride upon the top edge of the said lever. A pin 27 is placed in one of the holes 28 of the lever to form a stop against which the said hanger wheel rests when the valve parts are set as shown in Fig. 2. By this construction it will be noted that the weight may be adjusted to or from the shaft or the pivotal axis so as to give the proper leverage and afford the required resistance to the disk within the valve body. The purpose of the weight therefore is to hold the disk up in the position shown in the drawings and against the auxiliary valve 29 of the construction and purpose of operation of which will later be described.

The action of an excess amount of steam flowing through the valve from inlet to outlet is to force the disk forward to the position shown in dotted lines against the resistance of the weight, thus causing the same to move in and down by reason of the roll running down the incline into the curved portion 30 of the lever. In this respect it will also be apparent that the moment the lever is raised to dotted line and the weight is run into the curved part of lever as designated by dotted lines, the resistance of the weight, lever and disk is reduced to a minimum.

31 represents an intermediate chamber in valve body above the outlet, which is connected with the piston chamber above the piston through a port 32 as clearly shown in Fig. 2, whereby a free passage of steam from one chamber to the other is permitted. A second port 33 is provided in the lower part of the said chamber 31 having an annular tapered valve seat in its upper end. A screw plug 34 closes a tapped opening in the chamber in line with the said lower port 33. Within the said plug is a small bore 35 that forms a guide for the valve stem 36 carrying the auxiliary valve 29 that engages and closes the seat surrounding the port 32, while the wings 37 attached to the said valve are extended through the port to form a guide for the valve, to insure the proper seating of the same to close the port. A spring 38 encircles the valve stem intermediate of said valve and the inner end of plug in a way to hold the valve down upon its seat to close the said port, thus closing the passage intermediate of the piston chamber above the piston, and outlet side of the valve. Upon the disk 17 is formed an arm 39 having a lug 40 to engage the casing to form a stop for the disk, while the end of said arm is designed to engage the under edge of the wings of the valve in a way to normally hold the valve open through the action of the weight 24 before mentioned.

With the valve connected up intermediate a boiler, and header and set for service having lever, weight, disk, auxiliary valve and other parts, in position shown in Fig. 2, the moment the boiler began to supply steam at equal pressure to the other boilers connected to the common header, the pressure to the valve would lift the piston 11, and the valve 12 so that the steam would flow therethrough to header while the steam that flows through the pin valve 16 would also pass on by way of the chamber 31 and the auxiliary valve to outlet.

The swinging disk and other parts remain in position shown until a rupture occurs on the outlet side of the valve, as for instance by the bursting of the header, or main steam pipe leading therefrom causing a high velocity of steam to pass through the valve, it in turn would act upon the disk to swing the same outward to position shown in dotted lines Fig. 2, lifting the lever 23 upward causing the weight to slide down in the curve and release its hold, thus also releasing the auxiliary valve and permitting it to close by the action of its spring. The closing of this valve stops the escape of steam from the chamber 9 above the piston thereby causing the pressure to build up therein through the port of pin valve which increase pressure upon top side of piston forces the main valve closed thereby cutting off a further discharge of steam. To reset the valve it is only necessary to draw down upon the outer end of the lever 23 and run the weight out until the roll strikes against the pin, which action of the lever in turn sets the disk and again opens the auxiliary valve, releasing the pressure from above the piston which allows the greater pressure thereunder to raise the same and open the main valve. On the other hand should the particular boiler to which the valve is connected become ruptured and the steam from header and other connected boilers begin to flow back into the leaking boiler, the pressure in the inlet side 6 of the valve would fall and cause the inflowing steam through the open auxiliary valve to build up on the top side of piston 11 greater than that beneath it or its valve, by reason of the greater area of surface four to one, of said piston to that of the valve port, thereby driving the main valve 12 to its seat and closing the same. As the pressure continues to fall through continued loss of steam through the rupture in the boiler the greater becomes the steam force holding the valve closed against the smaller pressure under the valve. It will further be apparent that when a series of boilers are connected up in battery as through a header, and equipped with one of my valves intermediate of each boiler and the header, and should the steam in one of the boilers become low or it go out of service my valve will automatically close.

The function of the pin valve is to prevent the backward flow of the small volume of steam which would pass through the passage but otherwise said pin has but little effect on the operation. The passage or port into which this pin valve sets is essential to insure the passage of enough steam to guarantee the closing of the main valve when the steam is flowing in normal or forward direction.

It will be seen that by adjusting the weight on the lever any desired resistance to the swing of the disk 17 may be obtained, but in practice there will be a maximum and a minimum point of suspension for the weight established by the length and curve of the lever so that it will be impossible to set the weight at a point where it would prevent automatic action of the valve or at a point where there would be danger of the weight traveling back and working the cut off when the valve is operating under normal conditions. It will also be apparent that the valve can be manually operated at any time should occasion require by simply engaging and raising the lever from position shown in Fig. 2, thus swinging the disk to release the auxiliary valve.

Having thus described my invention what I claim and desire to secure by Letters Patent is:—

1. In a valve of the class described, the combination of a body having an inlet and an outlet with a ported division wall therebetween, a valve operatively mounted within the body to open and close the port, a swinging disk mounted within the passage through the valve and adapted to be operated by an excess flow of steam therethrough, and means intermediate the disk and valve for operating the latter by the former.

2. In a valve of the class described, the combination of a body having an inlet and an outlet with a ported division wall therebetween, a main valve operatively mounted to open and close the port, a swinging disk mounted within the passage through the valve and adapted to be operated by an excess flow of steam therethrough, an auxiliary valve intermediate of the outlet and main valve chambers and adapted to be operated by the said disk for the purpose of opening and closing the main valve.

3. In a valve of the class described, the combination of a body having an inlet and an outlet with a ported division wall therebetween, a valve operatively mounted within the body to open and close the port, a swinging disk mounted within the outlet passage from the valve body, a chamber intermediate the outlet and inlet side of the valve, an auxiliary valve mounted within the chamber adapted to be operated by the disk for the purpose of opening and closing the passage to and from the intermediate chamber and whereby the main valve is operated.

4. In a valve of the class described, the combination of a body having an inlet and an outlet with a ported division wall therebetween, a piston valve operatively mounted within the upper portion of the body to open and close the port, a chamber intermediate of the piston chamber and outlet having ports connecting the two, an auxiliary valve operatively mounted within said intermediate chamber adapted to open and close one of the said ports, a swinging disk mounted within the outlet adapted to engage the auxiliary valve to open and close the same and whereby the main valve is operated.

5. In a valve of the class described, the combination of a body having an inlet and outlet with a ported division wall therebetween, a piston valve operatively mounted within the body to open and close the port, an auxiliary valve adapted to open and close a by-pass from the piston chamber to the outlet, a disk within the steam outlet to be effected thereby and operate the said auxiliary valve by an excess flow of steam through the valve.

6. In a valve of the class described, the combination of a piston valve, an auxiliary valve for operating the piston valve, a swinging disk to engage and manipulate the auxiliary valve and adapted to be operated by the flow of steam through the outlet of main valve, a weight for normally holding the disk in a position to hold open the auxiliary valve.

7. In a valve of the class described, the combination with a suitable valve body, of a piston valve mounted therein, an auxiliary valve intermediate of the piston chamber and the outlet side of the valve for controlling the steam pressure on top of piston, a swinging disk mounted within a steam passage through the valve bearing an arm to engage the auxiliary valve to normally hold the same in an open position, and means connected with the disk for normally holding the same in engagement with said auxiliary valve.

8. In a steam boiler cut off valve, the combination with a piston valve adapted to be operated by steam pressure against the piston, an auxiliary valve connected with the piston chamber, a transverse shaft journaled in the body, a disk hung upon the shaft to engage and operate the auxiliary valve, a lever and weight connected to the outer end of the transverse shaft for retaining the disk in a normal position.

9. In a steam boiler cut off valve, the combination with a swinging disk mounted in the outlet side of the valve, a rocker shaft to which the disk is mounted, a curved lever connected to the outer end of the shaft, a weight adjustably mounted upon the lever to normally retain the disk in a forward position but adapted to be effected by the excessive flow of steam therethrough, a main valve, and means intermediate thereof and the swinging disk whereby the valve may be opened by the action of the back steam pressure when the disk is arranged in its normal position.

10. The combination with a valve body, of a piston valve mounted therein, a pin valve mounted within a port through the piston, an auxiliary valve mounted intermediate of a steam port from piston chamber to outlet side of the valve, a spring for normally holding the auxiliary valve in a closed position, a swinging disk with means for engaging and normally holding the auxiliary valve in an open position, said disk being arranged and adapted to be effected by an excessive flow of steam through the valve whereby both the auxiliary valve and piston valve are closed.

Signed at Bridgeport, in the county of Fairfield, and State of Connecticut this 21st day of October, A. D., 1908.

GEORGE W. COLLIN.

Witnesses:
C. M. NEWMAN,
RUTH RAYMOND.